United States Patent [19]

Kida et al.

[11] Patent Number: 4,835,679
[45] Date of Patent: May 30, 1989

[54] MICROPROGRAM CONTROL SYSTEM

[75] Inventors: Hiroyuki Kida; Hideo Maejima, both of Hitachi, Japan

[73] Assignee: Hitachi, Ltd., Tokyo, Japan

[21] Appl. No.: 818,685

[22] Filed: Jan. 14, 1986

[30] Foreign Application Priority Data

Jan. 24, 1985 [JP] Japan ................ 60-11520

[51] Int. Cl.⁴ .............. G06F 9/22; G06F 13/00
[52] U.S. Cl. .................................. 364/200
[58] Field of Search ... 364/200 MS File, 900 MS File, 364/757, 787; 307/468

[56] References Cited

U.S. PATENT DOCUMENTS

| | | | |
|---|---|---|---|
| 4,251,862 | 2/1971 | Murayama | 364/200 |
| 4,325,121 | 8/1982 | Gunter et al. | 364/200 |
| 4,348,736 | 9/1982 | Weinberger | 364/787 |
| 4,370,729 | 7/1983 | Bosch | 364/200 |
| 4,394,736 | 7/1983 | Bernstein et al. | 364/200 |
| 4,402,043 | 8/1983 | Guttag et al. | 364/200 |
| 4,422,144 | 12/1983 | Johnson et al. | 364/200 |
| 4,467,415 | 8/1984 | Ogawa | 364/200 |
| 4,468,735 | 8/1984 | Gotze et al. | 364/200 |
| 4,504,904 | 3/1985 | Moore et al. | 364/200 |
| 4,509,114 | 4/1985 | Leininger et al. | 364/200 |
| 4,546,273 | 10/1985 | Osman | 307/468 |
| 4,566,075 | 1/1986 | Guttag | 364/757 |

FOREIGN PATENT DOCUMENTS

| | | | |
|---|---|---|---|
| 0016332 | 1/1986 | Japan | 364/200 |
| 0088336 | 5/1986 | Japan | . |
| 0134838 | 6/1986 | Japan | 364/200 |

OTHER PUBLICATIONS

M. S. Schmookler, "Two-Level Programmed Logic Array Adder", I.B.M. Technical Disclosure Bulletin, vol. 21, No. 11, Apr. 79, pp. 4313–4316.

Primary Examiner—Gareth D. Shaw
Assistant Examiner—Viet Q. Nguyen
Attorney, Agent, or Firm—Antonelli, Terry & Wands

[57] ABSTRACT

Micro instructions having a predetermined relationship with respect to each other are modified so that an original micro instruction and address assigned thereto can be restored by combining one or more modified micro instructions and address assigned thereto. A microprogram memory stores the micro instructions in such a modified form and at the modified address. When an original address is designated, one or more term lines are activated in a decoder of the microprogram memory, and modified micro instructions corresponding to the activated term lines are read-out from a memory array of the microprogram memory. The read modified micro instructions are logically combined to restore the original micro instruction. Thereby, the number of micro instructions to be actually stored in the microprogram memory can be reduced.

5 Claims, 10 Drawing Sheets

MACRO INSTRUCTIONS

FIG. 4c
GATHERING OF MICRO INSTRUCTIONS

| MICRO INSTRUCTION | ADDRESS | OP CODE etc. | NEXT ADDRESS |
|---|---|---|---|
| (Pa) | a00 | P | a01 |
| (Pb) | b00 | P | b01 |
| (Pc) | c00 | P | c01 |
| (Pd) | d00 | P | d01 |

FIG. 4d
ASSIGNMENT OF ADDRESS

| MICRO INSTRUCTION | ASSIGNED ADDRESS | OP CODE etc. | NEXT ADDRESS |
|---|---|---|---|
| (Pa) | J00 | P | K00 |
| (Pb) | J01 | P | K01 |
| (Pc) | J10 | P | K10 |
| (Pd) | J11 | P | K11 |

FIG. 4e

| MICRO INSTRUCTIONS | HAMMING DISTANCE | |
|---|---|---|
| | betw ASSIGNED ADDRESSES | betw NEXT ADDRESSES |
| (Pa)−(Pb) | 1 | 1 |
| (Pb)−(Pc) | 2 | 2 |
| (Pc)−(Pd) | 1 | 1 |
| (Pd)−(Pa) | 2 | 2 |

FIG. 4f
ALLOCATION ON DECODER & MEMORY

| (DECODER) | (MEMORY) | |
|---|---|---|
| | OP CODE etc. | NEXT ADDRESS |
| J∗∗ | P | K00 | ⇒ PRIMARY MICRO INSTRUCTION
| J∗1 | ⊖ or P | ⊖ or K01 | ⇒ SECONDARY MICRO INSTRUCTION
| J1∗ | ⊖ or P | ⊖ or K10 |

∗ : DON'T CARE BIT
⊖ : ALL BITS ARE ZERO

| MICRO INSTRUCTION | ADRS ASSIGNED | NEXT ADRS | CONTENT OF PROCESSING |
|---|---|---|---|
| Pa | 0 1 1 0 0 0 0 0 | 0 1 1 0 0 1 0 0 | P |
| Pb | 0 1 1 0 0 0 0 1 | 0 1 1 0 0 1 0 1 | P |
| Pc | 0 1 1 0 0 0 1 0 | 0 1 1 0 0 1 1 0 | P |
| Pd | 0 1 1 0 0 0 1 1 | 0 1 1 0 0 1 1 1 | P |

FIG. 6a

|     |     |   |     |
|-----|-----|---|-----|
| (Pa) | a 0 0 | P | a 0 1 |
| (Pb) | b 0 0 | P | b 0 1 |
| (Pc) | c 0 0 | P | c 0 1 |
| (Pd) | d 0 0 | P | d 0 1 |
| (Pe) | e 0 0 | P | e 0 1 |
| (Pf) | f 0 0 | P | f 0 1 |
| (Pg) | g 0 0 | P | g 0 1 |
| (Ph) | h 0 0 | P | h 0 1 |

FIG. 6b

|     |        |   |        |        |
|-----|--------|---|--------|--------|
| (Pa) | J' 000 | P | K' 000 | K' 000 |
| (Pb) | J' 001 | P | K' 001 | K' 001 |
| (Pc) | J' 010 | P | K' 010 | K' 100 |
| (Pd) | J' 011 | P | K' 011 | K' 101 |
| (Pe) | J' 100 | P | K' 100 | K' 010 |
| (Pf) | J' 101 | P | K' 101 | K' 011 |
| (Pg) | J' 110 | P | K' 110 | K' 110 |
| (Ph) | J' 111 | P | K' 111 | K' 111 |

FIG. 6c

| J' * * * | P | K' 000 | K' 000 |
|----------|---|--------|--------|
| J' * * 1 | ⊕ | ⊕ 001  | ⊕ 001  |
| J' * 1 * | ⊕ | ⊕ 010  | ⊕ 100  |
| J' 1 * * | ⊕ | ⊕ 100  | ⊕ 010  |

FIG. 6d

| MICRO | HAMMING DISTANCE | |
| INSTRUCTIONS | betw ASSIGNED ADDRESSES | betw NEXT ADDRESSES |
|---|---|---|
| (Pa) − (Pb) | 1 | 1 |
| (Pb) − (Pc) | 2 | 2 |
| (Pc) − (Pd) | 1 | 1 |
| (Pd) − (Pe) | 3 | 3 |
| (Pe) − (Pf) | 1 | 1 |
| (Pf) − (Pg) | 2 | 2 |
| (Pg) − (Ph) | 1 | 1 |
| (Ph) − (Pa) | 3 | 3 |

FIG. 7a

| | | | |
|---|---|---|---|
| (Pa) | a 0 0 | P | a 0 1 |
| (Pb) | b 0 0 | P | b 0 1 |
| (Pc) | c 0 0 | P | c 0 1 |
| (Pd) | d 0 0 | P | d 0 1 |
| (Qe) | e 0 0 | Q | e 0 1 |
| (Qf) | f 0 0 | Q | f 0 1 |
| (Qg) | g 0 0 | Q | g 0 1 |
| (Qh) | h 0 0 | Q | h 0 1 |

FIG. 7b

| | | | | |
|---|---|---|---|---|
| (Pa) | J' 0 0 0 | P | K' 0 0 0 | K' 0 0 0 |
| (Pb) | J' 0 0 1 | P | K' 0 0 1 | K' 1 0 0 |
| (Pc) | J' 0 1 0 | P | K' 0 1 0 | K' 0 1 0 |
| (Pd) | J' 0 1 1 | P | K' 0 1 1 | K' 1 1 0 |
| (Qe) | J' 1 0 0 | Q | K' 1 0 0 | K' 0 0 1 |
| (Qf) | J' 1 0 1 | Q | K' 1 0 1 | K' 1 0 1 |
| (Qg) | J' 1 1 0 | Q | K' 1 1 0 | K' 0 1 1 |
| (Qh) | J' 1 1 1 | Q | K' 1 1 1 | K' 1 1 1 |

FIG. 7c

| | | | |
|---|---|---|---|
| J' 0 ✶ ✶ | P | K' 0 0 0 | K' 0 0 0 |
| J' ✶ ✶ 1 | ⊖ | ⊖ 0 0 1 | ⊖ 1 0 0 |
| J' ✶ 1 ✶ | ⊖ | ⊖ 0 1 0 | ⊖ 0 1 0 |
| J' 1 ✶ ✶ | Q | K' 1 0 0 | K' 0 0 1 |

|  | ADDRESS | CONTENT OF OPERATION |
|---|---|---|
| MICRO INSTRUCTION u | 0 1 0 1 0 0 1 0 | 0 0 0 1 0 1 |
| MICRO INSTRUCTION v | 0 1 0 1 0 1 0 0 | 0 1 1 0 0 0 |
| MICRO INSTRUCTION w | 0 1 0 1 0 1 1 0 | 0 1 1 1 0 1 |

MICROPROGRAM CONTROL SYSTEM

BACKGROUND OF THE INVENTION

1. Field of the Invention

The present invention relates to a microprogram control system having a microprogram memory which comprises decoding means for decoding addresses of a microprogram and memory means connected with the decoding means through micro instruction selecting lines for storing micro instructions of the microprogram, wherein the execution of a macro instruction read from a main memory is completed by successively executing a set of micro instructions prepared for the macro instruction in the memory means. Particularly, the invention relates to a microprogram control system having a microprogram memory which can be constructed of a reduced quantity of hardware or can utilize its storage capacity effectively, while having compatibility or flexibility for general purpose use, and further which is suited for application of LSI technology.

2. Description of the Related Art

With the recent remarkable progress in the MOS (Metal Oxide Semiconductor) technology, a high density of integration in integrated circuits has been achieved, resulting in the appearance of microcomputers of higher performance and improved functions. The higher density of integration is accompanied by more complicated logic, and thus main concerns and efforts are now concentrated on methods of constructing an integrated circuit by means of logic circuits which have regular structures. As one of them, a microprogram control system is well known.

In such a system, there is usually provided a memory called a microprogram memory or a control memory for its exclusive use which comprises a ROM (Read Only Memory). There are stored in the ROM many micro instruction sets, each of which corresponds to a specific macro instruction. Namely, one of the macro instructions is composed of a plurality of micro instructions which are prepared suitably for execution of the macro instruction. Although many micro instructions for various kinds of macro instructions are stored in the ROM, it is rarely the case that all the micro instructions for completing the execution of a certain macro instruction different from those for some other macro instructions. On the contrary, there are many cases where some micro instructions for a certain macro instruction are common to those for many other macro instructions. In some cases, a micro instruction for one macro instruction has the same function as that for an other macro instruction except the difference in the next address included in both micro instructions. In a conventional system, all the micro instructions have been assigned particular addresses in the address space of the ROM, whether or not the content of the micro instructions is the same as or similar to that of other micro instructions. Consequently, in the ROM, there exist a plurality of micro instructions which have a common bit pattern in an considerable part thereof, so that the ROM is inefficiently used. This results in an increase in the necessary storage capacity of the ROM.

In order to improve on this storage redundancy problem, Japanese Patent Laid-Open No. 57-203141 is known, for example. According thereto, there are provided a first microprogram memory for storing micro instructions having a long word length which are capable of general purpose use, a second microprogram memory for storing micro instructions of a shortened word length which are used often but for a limited purpose and a bit pattern generator which produces a signal having a predetermined bit pattern and adds the produced signal to the shortened word length micro instruction to restore the long word length micro instruction when the shortened word length micro instruction is read out from memory.

In this way, micro instructions used frequently are described and stored shortened word length so as to increase the working efficiency of the capacity of the ROM. Although this system is effective as a means to reduce the capacity of the ROM, it lacks compatibility for general purpose use, since the processing content capable of being expressed by the micro instructions of a shortened word length is limited and not all micro instructions can be expressed, when the ROM storing the micro instructions of the shortened word length is employed for storing other micro instructions. This is because a group of micro instructions of shortened word length for use of the limited purpose is formed therein. Also, when micro instructions for processing macro instructions of a different instruction system are formed, not all the micro instructions can be expressed by the micro instructions already stored in the ROM for those of a shortened word length in which the group of the exclusively-used micro instructions is formed. Consequently, it is necessary to construct other bit pattern generators generating many types of bit patterns as generated by the aforesaid bit patern generator. Thus, the ROM storing the micro instructions of a shortened word length lacks compatibility and flexibility for general purpose use.

SUMMARY OF THE INVENTION

An object of the present invention is to provide a microprogram conrol system which can effectively utilize the storage capacity of a microprogram memory comprising decoding means for decoding addresses of a microprogram and memory means connected with the decoding means through micro instruction selecting lines for storing micro instructions forming a microprogram, without reducing any compatibility or flexibility for general purpose use.

In the present invention, prescribed micro instructions are modified so that an original micro instruction and an address assigned thereto can be restored by combining one or more modified micro instructions and modified addresses assigned thereto. The microprogram memory according to the present invention stores micro instructions in such a modified form and at locations corresponding to the modified addresses. When an original address is applied to the decoding means, at least one of the micro instruction selecting lines is activated and the modified micro instructions corresponding to the activated micro instruction selecting lines are read from the memory means. The read modified micro instructions are logically combined to restore the original micro instruction.

According to an example in the present invention the above mentioned modification of micro instructions are achieved among micro instructions which have a common bit pattern, i.e a common code, in the relatively long fields (a common field) of the micro instruction except for a specific field arbitrarily noted. To those micro instructions are assigned particular original addresses, and the aforesaid specific field of each micro instruction is encoded according to a predetermined relationship with the original address assigned thereto. The original addresses and the codes of the specific fields are modified so that an original address can be restored by combining one or more modified addresses and a code of a specific field can be also restored by logically combining the modified codes of the specific fields corresponding to the combined modified addresses.

In another example, the modification of micro instructions is made for micro instructions each consisting of common fields and a specific field which has a bit pattern capable of being realized by logically combining specific fields of some of the micro instructions. A certain one among such micro instructions is assigned an address having a bit pattern which can be restored by logically combining addresses assigned to the micro instructions which are combined for realizing the specific field of the certain micro instruction.

According to the present invention, the number of micro instructions to be stored in a microprogram memory is compressed, since a micro instruction can be realized by logically combining one or more other micro instructions actually stored in memory. Such a compression of micro instructions enables a reduction in the storage capacity of the memory for attaining the same performance. This results in a reduction of the occupation area of the microprogram memory on an LSI chip. On the contrary, where the storage capacity of the memory is fixed, more micro instructions can be realized in accordance with the present invention. This results in a high performance for the microprogram control system.

Further, according to the present invention, the effect or advantage as mentioned above can be achieved without shortening the word length of micro instructions. Therefore, compatibility or flexibility, which is greatly limited by shortened word length micro instructions, is not impacted. Also, any additional elements or parts, such as a bit pattern generator as used in the conventional microprogram system, are not required.

BRIEF DESCRIPTION OF THE DRAWINGS

FIGS. 4a to 4f are an explanatory diagram and tables for explaining an example of the modification for compression of micro instructions;

FIGS. 6a to 6d are tables for explaining another example of the modification for compression of micro instructions;

FIGS. 7a to 7c are tables for explaining still another example of the modification for compression of micro instructions;

DESCRIPTION OF THE PREFERRED EMBODIMENTS

Figure 1:
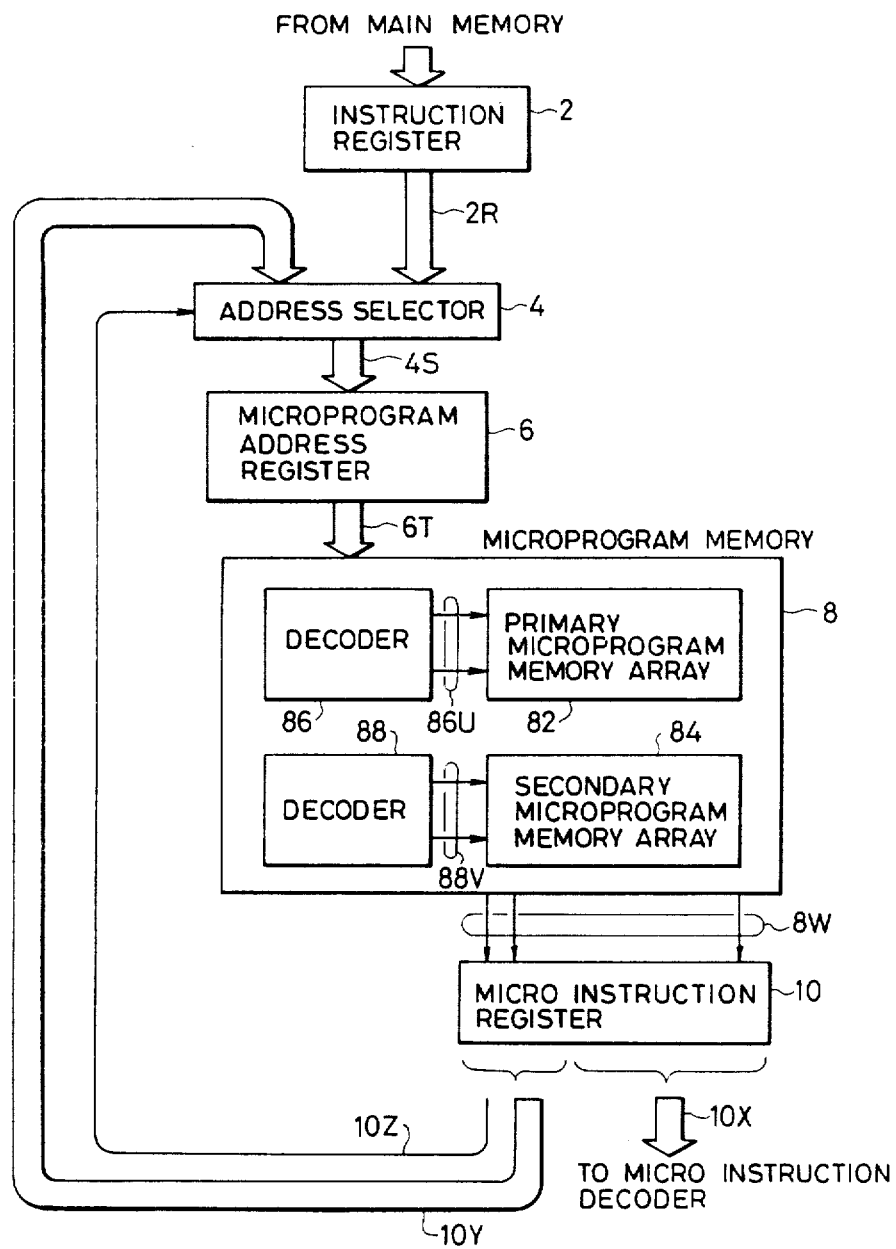
FIG. 1 is block diagram schematically showing a overall construction of a microprogram control system according to an embodiment of the present invention.

Referring to FIG. 1, the overall construction of a microprogram control system according to an embodiment of the present invention will be explained. In the figure, referencre numeral 2 denotes an instruction register which temporarily stores a macro instruction read out from a main memory (not shown) storing a user program. In this case, it is assumed that the macro instruction is composed of 8 bits. The macro instruction stored in the register 2 is coupled to an address selector 4, to which also a part of a micro instruction described below is applied. The selector 4 selects either one of an output signal 2R of the register 2 and a part 10Y of the micro instruction in response to a signal 10Z which is also a part of the micro instruction and will be described in detail below. A selected signal 4S is coupled to a microprogram address register 6 and temporarily stored therein. As will become apparent later, the register 6 contains a number of bits which is at least one bit greater than that of the instruction register 2. In this case, therefore, the register 6 consists of 9 bits, as the instruction register 2 has 8 bits.

The contents 6T of the microprogram address register 6 are coupled to a microprogram memory 8. In correspondence to the content 6T, a micro instruction is read out from the memory 8, which is coupled to a micro instruction register 10 through lines 8W and temporarily stored therein. A part 10X of the micro instruction is applied to a micro instruction decoder (not shown), in which the signal 10X is decoded and various control signal are generated in accordance with the result of the decoding operation. These signals control various elements of a processing system, such as a main memory, an operating unit, peripheral devices and so on. Therefore, the so-called operation code is included in this part 10X. The remaining parts 10Y and 10Z of the micro instruction are coupled to the address selector 4, as described above. It is noted that, in this case, the part 10Y consists of 8 bits and the part 10Z has one bit. Accordingly, the register 6 needs 9 bits, as described above.

Usually, a microprogram memory comprises a decoder part and a microprogram memory part which is made of ROM. In the microprogram memory 8 used in the present embodiment, the microprogram memory part is divided into two parts, one of which is called a primary microprogram memory array 82 and the other a secondary microprogram memory array 84. The respective memory arrays 82, 84 have separate decoders 86, 88. The signal 6T from the register 6 is decoded in the decoders 86, 88, and access to the memory arrays 82, 84 is effected in accordance with the result of decoding through micro instruction selecting lines 86U, 88V, respectively.

Figure 1A:
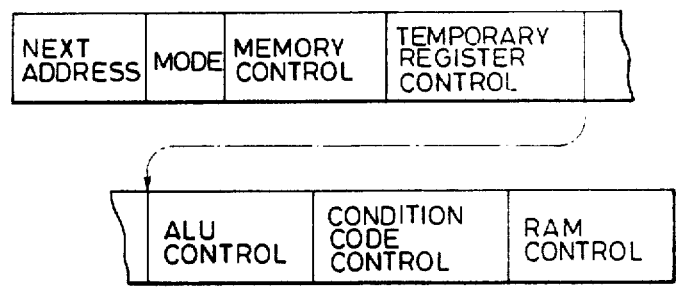
FIG. 1a is an explanatory diagram showing an example of typical micro instructions.

A typical example of the micro instruction read out from the microprogram memory 8 is shown in FIG. 1a. In this example, the micro instruction is composed of plural fields which are functionally distinguisable from one another. The first field is the next address field. As stated above, the execution of a macro instruction is completed by successively executing a set of micro instructions one after another. Therefore, each micro instruction includes the address of the next micro instruction to be executed. The content of this field indicates such an address. The second field is a mode field, the function of which is control of the address selector 4. If this field has a certain value, e.g. a logical "1", the selector 4 selects the signal 2R from the instruction register 2, so that the microprogram address register 6 stores the content of the register 2, i.e. the macro instruction. The remaining five fields include operation codes. Briefly speaking, their functions are as follows:

Memory Control: Initiation control of a read/write operation in a main memory or input/output devices;

Temporary Register Control: Control of registers in which the results of an arithmetic logic operation are temporarily stored;

ALU Control: Control of the operation in an arithmetic logic unit;

Condition Code Control: Control of information to be stored in a status register or a condition code register; and RAM Conrol: Control of the read/write mode of registers constructed in a RAM (Random Access Memory).

These operation code fields, as a whole, correspond to the signal 10X as shown in FIG. 1. Further, the first field corresponds to the signal 10Y and the second field to the signal 10Z.

Figure 2:
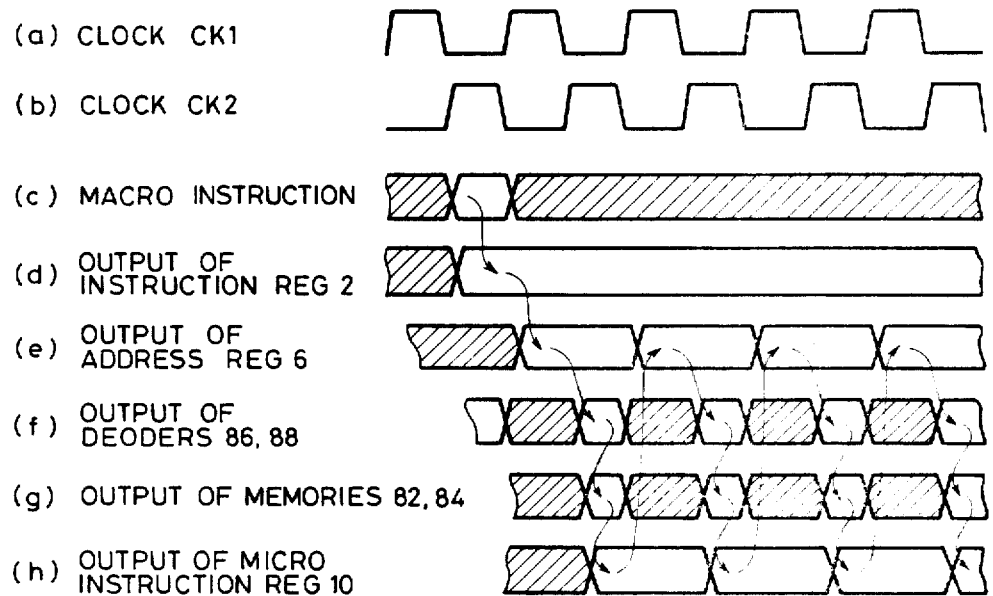
FIG. 2 is a time chart for explaining the operation of the micro instruction control system shown in FIG. 1.

Next, the operation of the system shown in FIG. 1 will be briefly described, referring to the time chart of FIG. 2. The system of FIG. 1 is activated by two system clocks CK1 and CK2 as shown in FIGS. 2(a) and (b). These clocks CK1 and CK2 have the same frequency and a phase difference of 180 degrees. However there is no overlapping duration in the pulse width between both clocks CK1 and CK2. Now assume that the execution of a certain macro instruction has been completed, and that the next macro instruction has been just read out from the main memory to the instruction register 2 (cf. FIG. 2(c)). The register 2 stores the read-out macro instruction thereafter until the subsequent instruction is read out, as shown in FIG. 2(d). Usually, the last one of a set of micro instructions for executing a macro instruction has the logical value "1" in its mode field. Therefore, by means of completion of the execution of the certain macro instruction, the logical value "1" is applied to the address selector 4 as the signal 10Z, so that the selector 4 selects the signal 2R, as mentioned above. Accordingly, the content of the instruction register 2 is located into the microprogram address register 6 at timing of the clock CK1, as shown in FIG. 2(e), and further it is coupled to the decoders 86, 88 at timing of the clock CK2, as shown in FIG. 2(f). Within the same clock, the micro instruction is read out from the memory arrays 82, 84 and coupled to the micro instruction register 10, as shown in FIG. 2(g). The micro instruction register 10 stores the read-out micro instruction until the next micro instruction is delivered, as shown in FIG. 2(h). As shown in FIG. 1a, the micro instruction includes an address indicating the location within the memory 8 where the micro instruction to be executed next is stored. Such a next address is transferred to the address selector 4 as the signal 10Y. Further, the micro instruction, except the last one, has the logical value "0" in its mode field. In the case mentioned above, therefore, the signal "0" is applied to the selector 4 as the signal 10Z, so that the selector 4 selects the signal 10Y. The next address included in the previous micro instruction is stored in the microprogram address register 6 at the timing of the clock CK1, as shown in FIG. 2(e). After that, the same operation as described above continues in response to the clocks CK1, CK2 until the execution of the last one of a set of micro instructions for the macro instruction is perfected, as show in FIGS. 2(e) to (h).

As is apparent from the above description, an entry one of a set of micro instructions for a macro instruction is directly designated by the macro instruction itself, not through an instruction decoder as usually utilized, which decodes a macro instruction to produce the address of an entry micro instruction. Namely, the macro instruction itself has information of the address of an entry micro instruction. A so-called mapping ROM system is known as a system in which, as mentioned above, a macro instruction read out from a main memory, or an operation code included therein, can directly designate the address indicating the location of an entry micro instruction of a microprogram stored in a ROM. FIG. 1 shows an example in which the present invention is embodied in a microprogram control system of the mapping ROM type as mentioned above. However, it should be understood that the application of the present invention is not limited to the mapping ROM type system, but the invention can be applied to all types of microprogram control systems. This will be apparent from the explanation below.

Figure 3:
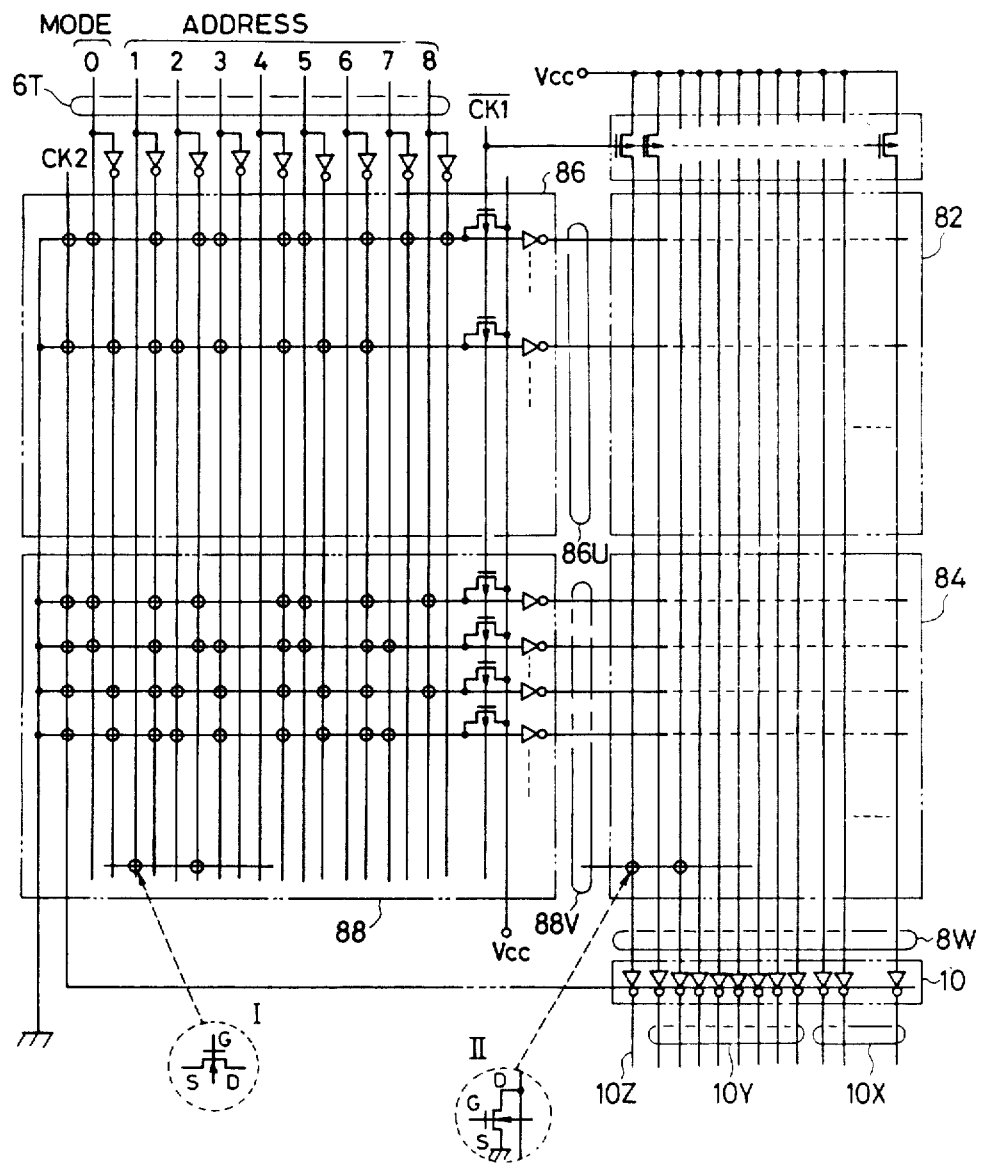
FIG. 3 schematically shows the structure of a microprogram memory used in the microprogram control system shown in FIG. 1.

Referring now to FIG. 3, the detailed structure of the microprogram memory 8 used in this embodiment will be explained. In the following description, the references used for the expression of signals in FIG. 1 are also utilized for indicating lines which carry the corresponding signals. Now, the output signal from the microprogram address register 6 is coupled to a mode line and address lines of the decoders 86, 88 of the microprogram memory 8. As described above, the output signal 6T consists of 9 bits, one bit of which corresponds to the mode signal supplied through the line 10Z and the remaining eight bits to the next address signal led through the line 10Y. In FIG. 3, a line No. 0 is a mode line and line Nos. 1 to 8 are address lines. The mode line and the address lines are extended through both the decoders 86, 88, each of which consists of a pair of lines, one of them being directly connected with a corresponding bit of the address register 6 and the other being connected therewith through an inverter. The former is called a positive line, e.g. a positive address line, and the latter a negative line, e.g. a negative address line. A micro instruction selecting line called a product term line (simply called a term line, hereinafter) 86U, 88V cross all the mode and address lines. In the figure, however, only six term lines are shown in examples. At selected cross points of the term lines and the mode or address lines, NMOS transistors are so provided that source and drain electrodes thereof are connected with the term line and a gate electrode is supplied with a signal through the mode or address line, as shown within a broken-line circle I in the figure. The cross points provided with the transistors are determined in dependence on the bit patterns, i.e. the codes, of the addresses assigned to the micro instructions. Namely, a transistor is provided in accordance with the following rule. If a certain bit of the code is "1", a transistor is provided at a cross point of the term line and the positive mode/address line corresponding to the certain bit. On the contrary, if "0" is set at another bit of the code, a transistor is provided at a cross point of the term line and the negative mode-/address line corresponding the other bit. Further, if there are provided no transistors at cross points of the term line and both the positive and negative mode/address lines corresponding to a certain bit, it means that the certain bit is treated as a don't care bit which has neither a "0" nor a "1". The term lines are further crossed by a clock lines CK2, and at all cross points thereof, NMOS transistors are provided in the same way as described above. In the figure, the cross points provided with the transistors are indicated by small circles.

One of the ends of all the term lines are grounded and the other ends are extended into the memory arrays 82, 84 through PMOS transisters driven by the clock $\overline{CK1}$ and inverters. The term lines extended from the decoders 86, 88 are crossed by a plurality of data lines which are extended through the memory arrays 82, 84. The number of data lines corresponds to the number of bits constructing the micro instruction. At selected cross points of the term lines and the data lines, there are provided NMOS transistors in such a manner as shown within the broken-line circle II in the figure. Namely, a drain electrode of the transistor is connected with the data line and a source electrode thereof is grounded. The transistor is driven by a signal applied to a gate electrode through the term line to ground the data line. Although the cross points to be provided with the transistors are determined in accordance with the bit pattern, i.e. the code, of the micro instructions to be stored in the memory arrays 82, 84, the indications of such cross points are omitted in the figure. One of the ends of the data lines are connected to the voltage source $V_{cc}$ through corresponding PMOS transistors which are driven by the clock $\overline{CK1}$. The other ends thereof are coupled to clocked inverters which form the micro instruction register 10. These clocked inverters are contolled by the clock CK2.

Figures 4A, 4B:
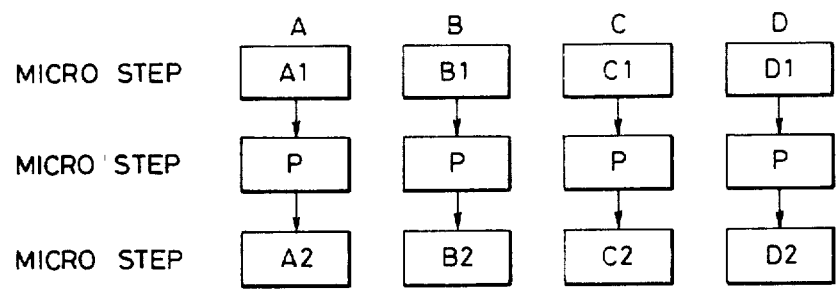

Next, referring to FIG. 4, the principle of the construction of the above described microprogram memory 8 is achieved. Now suppose that there exist macro instructions A, B, C and D which are schematically represented by respective flow charts of micro steps as shown in FIG. 4a. Namely, the macro instruction A consists of micro steps A1, P and A2. Similarly, the macro instruction B consists of micro steps B1, P and B2, the macro instruction C of micro steps C1, P and C2, and the macro instruction D of micro steps D1, P and D2. Accordingly, the macro instructions A, B, C and D all include the common micro step P. FIG. 4b illustratively shows the manner in which such micro instructions are stored in a conventional microprogram memory. In this figure, the micro instructions are divided into three parts, for simpler explanation. The first part is a mode field as shown in FIG. 1a. Similarly, the second part is a next address field and the third part consists of all the remaining fields including operation codes. Although the mode field and the next address field in this figure are reversed in the order of their position, compared with those of FIG. 1a, this is only for convenience sake of explanation and has nothing to do with the essential features of the invention. Characters a, b, c and d appearing in assigned address and the next address fields represent a particular bit pattern composed of 6 bits, e.g. a: "010100", b: "010101", c: "010110" and d: "011000". Therefore, the next address "a01" means 37 01010001" and the address "b00" means "01010100". The same is applied to other cases. Symbols [A], [B], [C] and [D] appearing in the assigned addresses indicate that these have address values directly designated by the macro instructions A, B, C and D. In other words, the macro instructions A, B, C and D have bit patterns indicating these addresses, respectively. Further, the symbol [−] included in the next address field indicates that an arbitrary bit pattern can be taken for this field. Usually, all 8 bits are filled with "0s". It is to be noted that this symbol resides only in the last one of a set of micro instructions for each macro instruction. Namely, the specific value is not necessary in the next address field of the last micro instruction, because the address of a micro instruction to be executed next is given by a subsequent macro instruction. In the third part of the micro instruction, the operation code and remaining codes are, as a whole, indicated by the same reference characters as those of the micro steps.

Taking an example of the macro instruction A, execution of the macro instruction will be briefly described. At first, the macro instruction A read out from the main memory is stored in the instruction register 2, and the address [A] is designated by the macro instruction A. The micro instruction stored at the address [A] is read out. The operation code, etc. A1 included in the read micro instruction is decoded and executed. Simultaneously, the mode "0" and the next address "a00" are applied to the address selector 4, which selects the next address "a00" because of the mode "0". As a result, the micro instruction at the address "a00" is read out, and the operation is execution in accordance with the operation code, etc. P. The mode "0" and the next address "a01" are delivered to the address selector 4. Also, at this time the selector 4 selects the next address included in the micro instruction, i.e. "a01", because of the mode "0". Accordingly, the macro instruction at the address "a01" is read out, and the operation is executed in accordance with the operation code, etc. A2. At the same time, the mode "1" and the next address [−] are delivered to the address selector 4. The execution of the macro instruction A is completed by finishing the execution of this micro instruction. In response to the mode "1", the selector 4 selects a new macro instruction which has been read into the instuction register 2 from the main memory subsequently to the macro instruction A. In cases of the macro instructions B, C and D, the execution thereof is done in the same way.

As is seen from FIG. 4b, the micro instructions including the operation code P have almost the same bit pattern and only in the next address field. In this way, in the conventional memory, there exist a plurality of micro instructions which have common bit patterns in a considerable part of fields except for certain specific fields, and those micro instructions each occupies a particular address within the address space of the memory. This results in the ineffectual use of the memory, which, in some cases, is accompanied with an unnecessary increase in the capacity of the memory.

In order to prevent this, according to the present invention, micro instructions are compressed to the reduced number of micro instructions by the assignment of address to micro instructions and the modification of on a microprogram memory as follows. First of all, from among all micro instructions to be considered for compression, micro instructions, the micro code (i.e. bit pattern), of which is common to one another in the fields, except specific fields arbitrarily noted in the micro instructions, are all gathered. The field which has the common micro code is called a common field, hereinafter. The result of having gathered such micro instructions is as shown in FIG. 4c. In this case, the specific field mentioned above is the next address field. Here, the gathered micro instructions of the addresses "a00", "b00", c00", and "d00" are named micro instructions Pa, Pb, Pc and Pd, respectively, for convenience of the following explanation. Next, the gathered micro instructions are assigned particular addresses which are used when the respective micro instructions are read out from the microprogram memory. These assigned addresses are called an original address, hereinafter. In the example shown in FIG. 4d, the micro instructions Pa, Pb, Pc and Pd are assigned original addresses "J00", "J01", "J10" and "J11", respectively, wherein J indicates the given bit pattern of 6 bits, similarly to a, b, c and d in FIG. 4b. As is apparent from FIG. 4d, the assigned original address comprises a part having the common bit pattern J and a part having the particular bit pattern to each original address. For convenience of the following explanation, the former part is denoted by common bits and the latter part denoted by distinguishing bits hereinafter. The distinguishing bits have a number of bits which is sufficient to express a distinction in the addresses of all the gathered micro instructions. In the case of FIG. 4d, since the number of the gathered micro instructions is four, two bits, such as "00", "01", "10" and "11" are used for this purpose. The codes of the specific fields of those micro instructions, i.e. the next address field in this case, are determined in accordance with the predetermined relation with the original address assigned to the respective micro instructions. In the case shown in the figure, with respect to the micro instructions Pa, Pb, Pc and Pd are assigned the original addresses "J00", "J01", "J10" and "J11", respectively, the codes "K00", "K01", "K10" and "K11" are given to the respective next address fields, wherein K also indicates the given bit pattern consisting of 6 bits.

The above-mentioned predetermined relationship will be explained below, with the aid of the well known Hamming distance. Namely, when the micro instructions are arranged in the order of the original addresses assigned thereto, the Hamming distance between the assigned original addresses of the micro instructions adjacent to each other is equal to that between the micro codes of the specific fields included in the two micro instructions, and further assuming that the number of the gathered micro instructions is m and the maximum value of the allowable Hamming distance is n, the following relation is satisfied:

$$2^{n-1} < m \leq 2^n \quad (1)$$

FIG. 4e is a table showing the result of having reviewd the above mentioned relation with respect to the assignment of address shown in FIG. 4d. As is apparent from this table, the Hamming distance between the assigned addresses of the micro instructions Pa and Pb, for example, is equal to that between the next addresses included therein. Further, since the number m of the gathered micro instructions is four, the maximum value n of the Hamming distance is two as those between the micro distances Pb, Pc and Pd, Pa. In other words, more generally speaking about the predetermined relation mentioned above, with respect to two micro instructions which satisfy the aforesaid relation (1), the codes of the specific fields of these micro instructions are so determined that the Hamming distance between the codes of the specific fields is equal to that between the original addresses of those micro instructions.

Now, it should be noted from FIG. 4d that the bit pattern of the micro instruction Pd can be realized by performing a logical sum of the remaining three micro instructions. Taking this fact into consideration, the micro instructions are modified for allocation on the microprogram memory. Referring to FIG. 4f, the method of this modification is explained. First of all, there is provided a modified instruction (called a primary micro instruction, hereinafter), which has certain micro codes in both the common field and the specific field. In FIG. 4f, the micro instuction which has the code "P" in the operation code field and the code "K00" in the next address corresponds to the primar micro instruction. The distinguishing bits of the address code assigned to the primary micro instruction are all made the don't care bits which carry neither "0" nor "1". In the figure, the address expressed by the code "J**" is assigned to the primary micro instruction, wherein the asterisk * indicates a don't care bit. As described above, such a don't care bit can be realized by providing no transistor at both points at which a pair of address lines of the bit marked with the asterisk crosses the term line.

Next, there are prepared a plurality of address codes, one of the distinguishing bits of which is a "0" or "1" and the remaining bits are made don't care bits. By the logical sum of the given combination of the prepared address codes the original addresses of all the gathered micro instructions can be restored. In the example of FIG. 4f, the address codes "J*1" and "J1*" are prepared. These address "J*1" and "J1*", including the address "J**", are called modified addresses, hereinafter. The common field of each of modified micro instructions assigned the prepared address codes is made either "0" in all bits thereof or the same bit pattern as that of the common field of the primary micro instruction. In FIG. 4f, symbol θ indicates that bits in question are all "0". The specific field of each of the secondary micro instructions is modified as follows. Namely, the portion corresponding to the common bits are made either "0" in all bits thereof or the same bit pattern as that of the common bits of the specific field in the primary micro instruction. The distinguishing bits of the specific field are so coded that they have "1" in at least one bit thereof and the bit pattern of the distinguishing bits in the micro instruction of the original address restored by the combination of the modified addresses can be generated by the logical add of the combination of the secondary micro instructions corresponding to the combined modified addresses.

For example, assuming that the micro instruction Pc is read out which has the code "P" in the operation code field and the code "K10" in the next address field. In order to read out this, the original address "J10" must be designated (cf. FIG. 4c). Now, in FIG. 4f, suppose the operation code field and the common bits of the next address field in the secondary micro instructions are made "0" in all bits thereof. At this time, if the modified addresses "J**" and "J1*" are combined by the logical add, the original address "J10" can be restored, because the don't care bit can be regarded as being functionally equal to "0". By combining in the logical sum the modified micro instructions corresponding to these addresses "J**" and "J1*", the operation code "P" can be obtained and the code of the next address field becomes "K10".

Allocation of the micro instructions on the memory is conducted in accordance with the modification as shown in FIG. 4f.

Figures 5A, 5B:
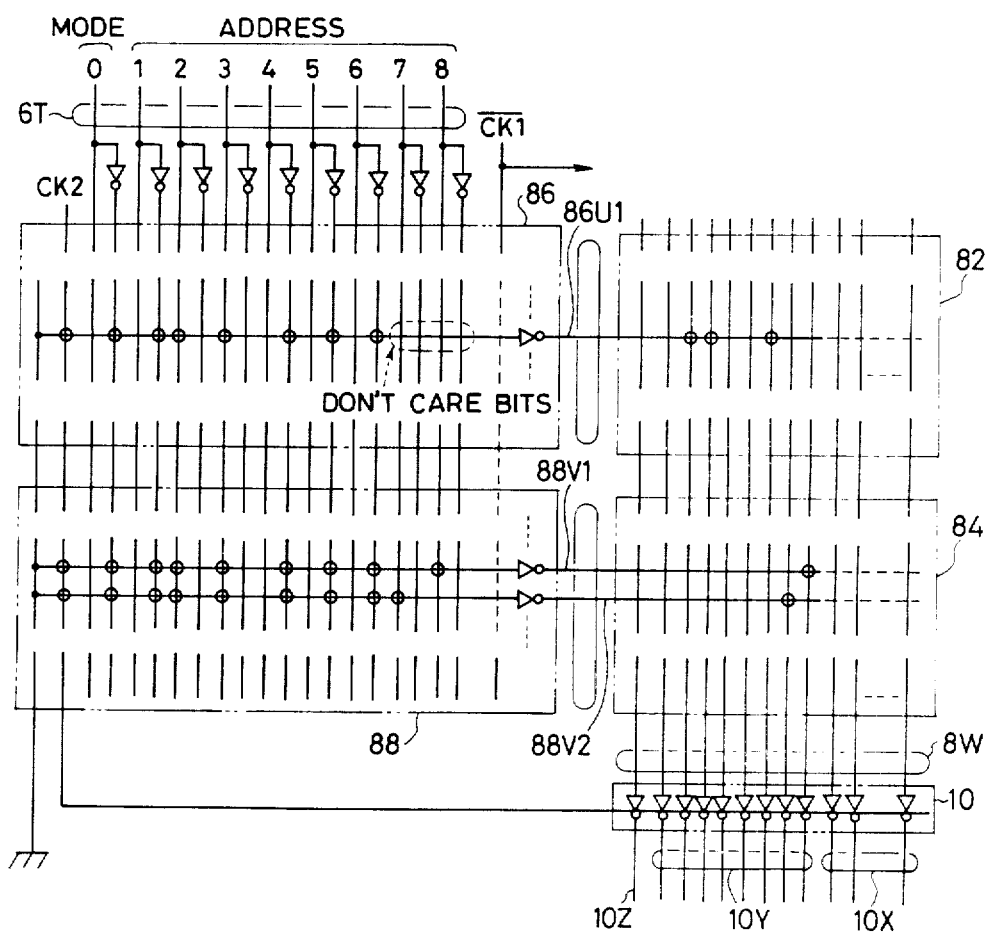
FIG. 5a shows an example of a set of compressed micro instructions and FIG. 5b shows the related portion of the microprogram memory in which the compressed micro instructions are allocated.

Referring to FIG. 5, the concrete structure when the modified micro instructions as shown in FIG. 4f are allocated in the microprogram memory 8 shown in FIG. 3 will be described. In this case, it is assumed that the bit patterns J and K are "011000" and "011001", respectively. Therefore, the original micro instructions Pa, Pb, Pc and Pd are shown as in FIG. 5a. In accordance with the modified micro instructions shown in FIG. 4f, every line in the decoders 86,88 and the memory array 82, 84 are wired as shown in FIG. 5b. This figure shows only the related portion of the microprogram memory 8 as shown in FIG. 3. If the code "01100000" (the assigned address of the micro instruction Pa) is applied to the address lines 1 to 8 (here assuming that the mode field is "0"), only the term line 86U1 which is precharged by the clock $\overline{CK1}$ is grounded in synchronism with the clock CK2, so that the term line 86U1 in the memory array 82 is kept at high a level. This state of the term line in the memory arrays 82, 84 is called "activated" hereinafter. As a result, the data lines in the memory arrays 82, 84 which have a transistor at a point where the term line 86U1 crosses are grounded, so that the code "01100100" appears at the lines 10Y. Accordingly, the micro instruction Pa with the code "01100100" in the next address field can be read out by designating the original address "01100000". Although the operation code "P" of the read micro instruction Pa appears at the lines 10X, the data lines corresponding the lines 10X are omitted in the figure.

Further, if the code "01100001" (the assigned address of the micro instruction Pb) is applied to the address lines 1 to 8, the term lines 86U1 and 88V1 are activated, so that the data lines which have a transistor at a point where the term lines 86U1 and 88V1 cross therewith are grounded, and hence the code "01100101" appears at the lines 10Y. Of course, in this case, the operation code "P" read out by the term line 86U1 appears at the lines 10X. By designating the original address "01100001", the micro instruction Pb can be read out. Moreover, if the code "01100011" (the assigned address of the micro instruction Pd) is applied to the address lines 1 to 8, the term lines 86U1, 88V1 and 88V2 are activated, so that the data lines which have a transistor at a point where the term lines 86U1, 88V1 and 88V2 cross thereover are grounded. As a result, the code "01100111" appears at the lines 10Y. Also in this case, the operation code "P" read out by the term line 86U1 appears at the lines 10X. The micro instruction Pd can be read out by designating the address code "01100011".

As is apparent from FIG. 5b, the primary one of the modified micro instructions is stored in the primary microprogram memory array 82, and the decoder 86 associated therewith is wired in accordance with the bit pattern of the modified address assigned to the primary micro instruction. Similarly, the secondary one of the modified micro instructions is stored in the secondary microprogram memory array 84, and the decoder 88 associated therewith is wired in accordance with the bit pattern of the modified address assigned to the secondary micro instructions. In this embodiment, as described above, four necessary micro instructions are realized by one primary and two secondary micro instructions, i.e. three modified micro instructions actually stored in the microprogram memory. In other words, it can be said that, according to this embodiment, four original micro instructions are compressed to three micro instructions. The more micro instructions having the commmon field that are gathered, the greater the effect that can be gained.

FIG. 6a shows another example in which eight micro instructions Pa to Ph having the common bit pattern P are collected. Similarly to the case of FIG. 4c, codes "a00" to "h00" indicate addresses assigned to the micro instructions Pa to Ph, respectively, and codes "a01" to "h01" are next address codes included in the respective micro instructions Pa to Ph. With respect to these micro instructions, the assignment of the original address and the coding of the specific field are conducted in accordance with the method described above. The result thereof is shown in FIG. 6b. In this case, the distinguishing bits of 3 bits must be prepared in the address code in order to express the distinction in the addresses of eight micro instructions. Therefore, the common bits J' of the original addresses assigned to the micro instructions and the common bits K' of the next address fields have the given bit patterns consisting of 5 bits, respectively, if, similarly to the case of FIG. 4, the address code is composed of total 8 bits. Further, the result of the modification is as shown in FIG. 6c. The primary one of the modified micro instructions which has the code "P" in the operation code field and the code "K'000" in the next address field is assigned the modified address "J'*". In this example, the operation code fields in three secondary ones of the modified micro instructions are made "0" in all bits thereof. One of the three secondary micro instructions is assigned the modified address "J'1" and has the code "θ001" in the next address field, and another one is assigned the modified address "J'*1" and has the code "θ010" in the next address field. The last secondary micro instruction which has the code "θ100" in the next address field is assigned the modified address "J'1**".

In the same manner as shown in FIG. 5b, the decoders 86, 88 are wired in accordance with the modified codes "J'*", "J'1", "J'*1*" and "J'1". In the memory arrays, the operation code "P" and the code "K'000" of the next address field are stored at the location corresponding to the modified address "J'*" in the primary microprogram memory array 82, and one of modified micro instructions of the operation code "θ" and the next address code "θ001", another one of the operation code "θ" and the next address code "θ010" and the last one of the operation code "θ" and the next address code "O100" are stored at the respective corresponding addresses in the secondary microprogram memory array 84. In this way, in this example, eight micro instructions can be compressed to four modified micro instructions actually stored in the microprogram memory 8.

Referring again to FIG. 6b, the distinguishing bits of the next address field contained in a certain micro instruction have the same bit pattern as that of the original address assigned to the certain micro instruction. The same also applied to the case of FIG. 4d. However, it is not always necessary to make the bit pattern of the distinguishing bits agree with each other between the assigned original address and the next address field. In a table framed by the broken line in FIG. 6b, there is shown an example in which the bit patterns of the distinguishing bits of the next address fields are not always the same as those of the assigned original addresses. Even in such a case, compression of the micro instructions is possible, if the assignment of the original address and the coding of the next address field are conducted in accordance with the principle described above. FIG. 6d shows the result of having reviewed the Hamming distance with respect to the example shown in the broken-line table in FIG. 6b. It will be understood that the result is the same as that of the case shown in the solid-line table. In the broken-line table of FIG. 6c, there is shown the result of encoding the next address field in the modified micro instruction which is achieved on the basis of the example as shown in the broken-line table of FIG. 6b.

FIG. 7 shows still another example of compression of the micro instructions. As is apparent from gathered mirco instructions Pa to Qh as shown in FIG. 7a, in this example the different operation codes "P" and "Q" are included therein. Further, with respect to every operation codes, four micro instructions are gathered which have the different bit patterns in the next address fields, respectively. Namely in this example, the compression of the micro instructions is attempted over the groups of micro instructions, each group having the particular operation code. First of all, through the micro instruction groups, the assignment of the original address and the encoding of the next address field are executed in accordance with the principle mentioned above, the result of which is shown in FIG. 7b. Although the number of micro instructions belonging to each group is four, three bits are provided for the distinguishing bits in the original address code and the next address field, because the total number of micro instructions gathered as an object of the compression is eight and the code of the three bits is necessary for expressing the distinction of eight addresses. Modification for allocation on the microprogram memory is carried out as follows. Concerning the micro instructions of the group having the operation code "P", the following modification is possible in the same manner as shown in FIG. 4:

| Assigned adrs | OP code | Next adrs |
|---|---|---|
| J'0** | P | K'000 (Primary) |
| J'0*1 | θ | θ001 (Secondary) |
| J'01* | θ | θ010 (Secondary) |

In the same way, with respect to the micro instructions of the group having the operation code "Q":

| Assigned adrs | OP code | Next adrs |
|---|---|---|
| J'1** | Q | K'100 (Primary) |
| J'1*1 | θ | θ001 (Seondary) |
| J'11* | θ | θ010 (Secondary) |

From the two tables above, it is noted that two set of the secondary micro instructions are comon to each other except the first bit of the distinguishing bits of the respective assigned addresses. Then, if this bit is made a don't care bit, that is to say, if the distinguishing bits of the assigned addresses in both sets of secondary micro instructions are "J'**1" and "J'*1*", those two sets of the secondary micro instructions become common so that they can be used for both combinations with the primary micro instruction having the operation code "P" and with the primary instruction having the operation code "Q". Finally therefore, the modified micro instructions as shown in FIG. 7c can be obtained. In this example, the eight micro instructions which have the different operation codes are compressed to the four modified micro instructions which comprise two primary micro instructions and two secondary micro instructions.

The general effect of compression method according to the present invention is as follows. If the number of gathered micro instructions which have the same micro code, i.e. the same bit pattern, is $2^n$ ($n = 0, 1, 2, \ldots$), such micro instructions can be compressed to $n+1$ sets of modified micro-instructions. Further, if there are m groups of the so gathered micro instructions and hence the total number of micro instructions is $2^n \times m$ ($m = 1, 2, 3, \ldots$), those micro instructions can be compressed to of $n+m$ sets of micro-instructions.

Figures 8A, 8B:
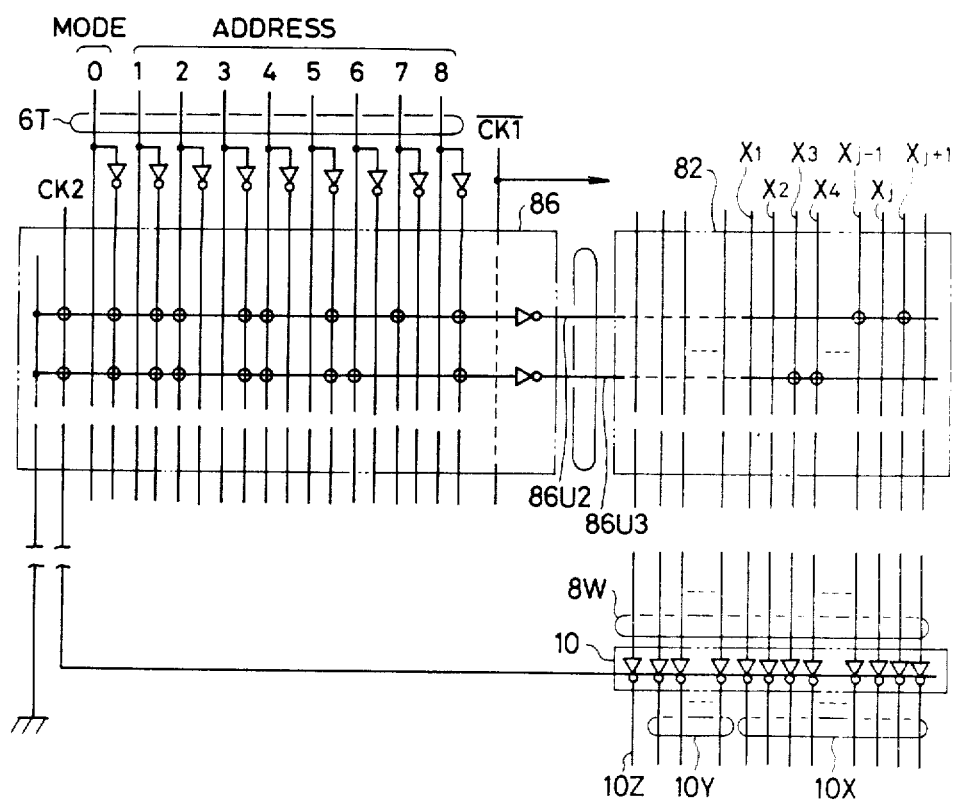
FIGS. 8a and 8b show another example of a set of micro instructions and the related portion of the microprogram memory in which the micro instructions are allocated.

In the examples described above, the specific field arbitrarily noted for compression was the next address field. However, the specific field is not limited thereto. Compression of the micro instructions is possible even when other fields are noted as the specific field mentioned above. FIG. 8 shows such a case wherein the operation code field is taken note of as the specific field. As shown in FIG. 8a, assuming that there exist three micro instructions u, v and w, which are assigned addresses "01010010", "01010100" and "01010110" and have codes "000101", "011000" and "011101" in their operation code fields, respectively. In the case of this example, the bit patterns of the assigned address and the operation code field in the micro instruction w can be obtained by the logical sum of those of the micro instructions u and v. FIG. 8b illustrates the concrete structure, but a related portion, of the microprogram memory 8 when the micro instructions shown in FIG. 8a are allocated therein. It is to be noted that 6 bits of each operation code are not realized in the successive data lines of the memory array 82, but are dispersedly allocated. Namely, the first three bits are allocated to the data lines $X_2$, $X_3$, $X_4$ and the remaining bits to the data lines $X_{j-1}$, $X_j$, $X_{j+1}$.

Then, if the code "01010010" is applied to the address lines 1 to 8 (at this time, assumed that the mode is "0"), the term line 86U2 is activated, so that the operation code "000101" appears at the corresponding bits of the lines 10X. Therefore, the micro instruction u can be read out by designating the address "01010010" assigned thereto. Similarly, when the code "01010100" is applied to the address lines 1 to 8, the term line 86U3 is activated, so that the operation code "011000" appears at the corresponding bits of the lines 10X. Accordingly, the micro instruction v can be read out by designating the address "01010100" assigned thereto. If the code "01010110" is applied to the address lines 1 to 8, the term lines 86U2 and 86U3 are activated simultaneously, so that the code "000101" read by the activated line 86U2 and the code "011000" read by the activated term line 86U3 appear at the corresponding data lines. This is equivalent to that the two codes read out are added logically. As a result, the operation code "011101" is coupled on the corresponding bits of the lines 10X. Namely, the micro instruction w is read out as the logical sum of the micro instructions u and v acutally stored in the memory array 82.

Figure 9:
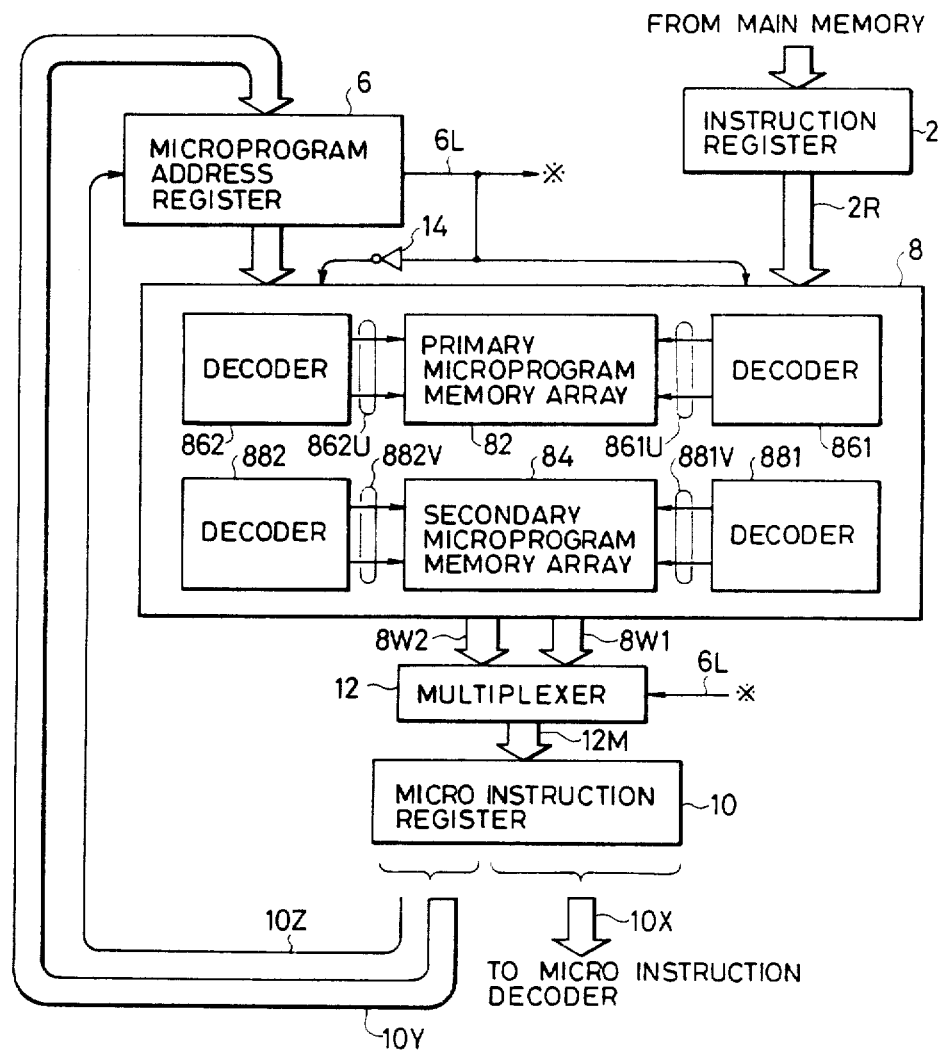
FIG. 9 is a block diagram schematically showing the overall construction of a microprogram control system according to another embodiment of the present invention.

Referring now to FIG. 9, there is shown the overall construction of the microprogram control system according to another embodiment of the present invention. In the figure, the same reference numerals or characters indicate the same elements as those shown in FIG. 1. The feature different from the embodiment of FIG. 1 is in that decoding of a macro instruction supplied from a main memory (not shown) and that of a part (a next address field) of a micro instruction read from a microprogram memory 8 are conducted by two separate sets of decoders 861, 881 and 862, 882. Namely, the macro instruction, which is read out from the main memory and stored in an instruction register 2, is decoded by a set of the decoders 861 and 881, and access to a primary and a secondary microprogram memory arrays 82 and 84 is made through lines 861U and 881V. A part of the mirco instruction coupled from a micro instruction register 10 is temporarily stored in a microprogram address register 6 and decoded by another set of the decoders 862 and 882. As a result access to the primary and the secondary microprogram memory array 82 and 84 is effected through lines 862U and 882V. When the memory arrays 82 and 84 are accessed from the decoders 861 and 881, that is, in the case of the access by the macro instruction, the micro instruction read from the memory arrays 82 and 84 is coupled to a multiplexer 12 through a line 8W1, and when the memory arrays 82 and 84 are accessed from the decoders 862 and 882, the read micro instruction is coupled to the multiplexer 12 through a line 8W2. The multiplexer 12 selects either one of the micro instructions coupled through the lines 8W1 and 8W2 in response to a signal 6L applied from the microprogram address register 6, and outputs the selected micro instruction to the micro instruction register 10. The signal 6L from the address register 6 also controls the switchover of the operations of two sets of the decoders 861, 881 and 862, 882. Namely, the signal 6L is coupled to the decoders 861, 881 directly and to the decoders 862, 882 through an inverter 14. The signal 6L is produced in correspondence with the mode field, which is included in the micro instruction and, as described before, supplied to the address register 6 through a line 10Z. If the mode field is "0", the signal 6L at a low level is produced. The low level signal 6L is inverted in the inverter 14 to allow the decoders 862, 882 access to the memory arrays 82, 84, and inhibits the decoders 861, 862 from making access to the memory arrays 82, 84. Simultaneously, the low level signal 6L has the multiplexer 12 select the micro instruction led through the line 8W2. To the contrary, if the mode field is "1" the signal 6L is at a high level. The high level signal 6L is coupled to the decoders 861, 881 to enable them, so that the access to the memory arrays 861, 881 caused by the macro instruction is enabled. At this time, the multiplexer 12 selects the micro instruction read out through the line 8W1 in response to the high level signal 6L. The micro instruction selected in the multiplexer 12 is temporarily stored in the micro instruction register 10. A part of the stored micro instruction, which includes the operation code field, is coupled to a micro instruction decoder (not shown) through a line 10X, in which it is decoded and various kinds of control signals are generated to execute the micro instruction. The remaining part of the micro instruction stored in the register 10, which includes the next address field and the mode field, is coupled to the microprogram address register 6 through the lines 10Y and 10Z. The operation after that is as described above.

In the system described above, the microgrogram memory 8 is constructed in almost the same manner as that of FIG. 1, except that the outputs of the decoders 861, 881 and 862, 882 are gated in response to the signal 6L. Accordingly, the allocation of micro instructions on the memory arrays 82, 84 and the wiring of the decoders 861, 881, 862, 882 are also achieved in the same manner as those described in connection with the embodiment of FIG. 1. The effect of this embodiment, which is superior to that of FIG. 1, is in the reduction in the duration of time from when a certain micro instruction has been read out to the time when the successive micro instruction is read, because the address selector 4 used in FIG. 1 is omitted. Actually, this time duration seriously affects the performance of the microprogram control system. Therefore, its reduction results in the much improved performance of the system.

We claim:

1. A microprogram memory arrangement for compressing microinstructions used in a microprogram control system in which the execution of a macro instruction stored in a main memory is effected by successively executing a plurality of micro instructions associated therewith, comprising:
    memory means for storing micro instructions of a micro program to be executed, said micro instructions being stored in a modified form on the basis of common bit patterns contained within the micro instructions;
    decoding means for decoding the addresses of a micro program and activating at least one micro instruction address line which is coupled to said memory means in accordance with the address applied thereto; and
    means for selectively combining said modified micro instructions in accordance with the activation of said micro instruction address lines by said decoding means to thereby produce a micro instruction in a restored form.

2. A micro program memory arrangement according to claim 1, wherein the address of an entry micro instruction of a set of micro instructions associated with a macro instruction is directly designated by the macro instruction read out from main memory.

3. A micro program memory arrangement according to claim 2, wherein said decoding means includes means for decoding a macro instruction read from said main memory so as to activate at least one micro instruction address selecting line and means for decoding a micro instruction for activating at least one of said micro instruction address selecting lines.

4. A micro program memory arrangement according to claim 1, wherein a primary micro instruction including a bit pattern of a common field causes a particular micro instruction address line, wired in accordance with said bit pattern of said common field to become activated in response to the address of an original micro instruction.

5. A micro program memory arrangement according to claim 1, wherein first micro instructions including bit patterns in a specific field of said micro instructions are formed by logically combining bit patterns in specific fields of other micro instructions, said first micro instruction being assigned memory addresses, wherein bit patterns of said assigned memory addresses of said first micro instructions can be restored by logically combining bit patterns of memory addresses of the other micro instructions, and wherein said decoding means is wired in accordance with said assigned addresses.

* * * * *